United States Patent [19]

Funk et al.

[11] Patent Number: 4,617,126

[45] Date of Patent: Oct. 14, 1986

[54] MEMBRANE SEPARATION OF HYDROCARBONS

[75] Inventors: Edward W. Funk, Highland Park; Sudhir S. Kulkarni, Hoffman Estates; Y. Alice Chang, Des Plaines, all of Ill.

[73] Assignee: UOP Inc., Des Plaines, Ill.

[21] Appl. No.: 637,638

[22] Filed: Aug. 3, 1984

[51] Int. Cl.$^4$ .............................................. B01D 13/00
[52] U.S. Cl. ................................ 210/651; 210/500.41
[58] Field of Search ............ 210/638, 640, 651, 321.1, 210/321.2, 500.2; 208/31, 308, 321

[56] References Cited

U.S. PATENT DOCUMENTS 3,228,877  1/1966  Mahon ......................... 210/500.2 X
3,950,247  4/1976  Chiang et al. .................. 210/640 X
4,368,112  1/1983  Thompson et al. .................... 208/31

FOREIGN PATENT DOCUMENTS 0149399  9/1982  Japan .................................... 210/651

*Primary Examiner*—Frank Spear
*Attorney, Agent, or Firm*—Thomas K. McBride; John F. Spears, Jr.; Raymond H. Nelson

[57] ABSTRACT

Mixtures of heavy oils and light hydrocarbons may be separated by passing the mixture over a polymeric membrane which comprises a polymer capable of maintaining its integrity in the presence of hydrocarbon compounds at temperature ranging from about ambient to about 100° C. and pressures ranging from about 50 to about 1000 psi. The membranes which possess pore sizes ranging from about 10 to about 500 Angstroms are cast from a solvent solution and recovered.

15 Claims, No Drawings

MEMBRANE SEPARATION OF HYDROCARBONS

The government of the United States of America has rights in this invention pursuant to Contract No. DE-AC07-821D12422 awarded by the U.S. Department of Energy.

BACKGROUND OF THE INVENTION

The conventional methods of separating various hydrocarbons involves technology which includes extraction, absorption, distillation, etc. techniques. However, a disadvantage of utilizing these techniques involves the use of energy which, in the present time, is relatively expensive. For example, in one aspect of petroleum refining a particular application step involves the deasphalting of a heavy crude oil which is recovered from a petroleum source such as a well. The crude oil is generally first passed to an atmospheric pipe still to produce light gases as well as a variety of distillation cuts suitable for use in the synthesis of fuels such as gasoline, etc. as well as cuts which may be useful in the petrochemical industry. The bottoms or bottom fraction from this atmospheric distillation still may then be passed to a vacuum distillation still which will recover lighter products as volatile material which can then be utilized to prepare other fuels such as diesel oil. However, as the feedstocks become heavier in nature, a significant amount of the fuel oil is not volatilized in either the atmospheric or vacuum stills.

In order to recover still useable oil fractions, the heavy bottoms from the vacuum distillation still is then subjected to the action of a solvent which comprises a relatively light hydrocarbon such as a paraffinic hydrocarbon containing from 3 to 7 carbon atoms. In order to obtain the desired fractionation of useable products, a high ratio of solvent to oil is required. For example, in the case of asphaltenes which are precipitated out of the heavy fraction a typical process will operate with a solvent to oil weight ratio of 4:1 to 10:1 depending upon the degree of oil/asphaltene separation desired. The desired oil fraction, after separation from the precipitated asphaltenes will be recovered while, due to the expense of the solvent required for the separation, it is necessary to recover the solvent for further use. The high ratio of solvent to oil usually requires energy intensive processes due to the need for recovering the solvent by volatilization.

In view of the expense associated with the volatilization processes, it is deemed necessary to provide a relatively low-cost method for recovering the solvent by separation from the oil in order to reuse the solvent in further oil recovery steps. It has now been discovered that a method for separating relatively light hydrocarbons such as those employed as solvents from relatively heavy oil may be accomplished by passing the mixture of heavy oil and solvent over a membrane of the type hereinafter set forth in greater detail whereby an effective separation of solvent from heavy oil may be effected, thus permitting the recovery and reuse of the desirable solvent in further extraction processes.

BRIEF SUMMARY OF THE INVENTION

This invention relates to a process for the separation of heavy oils from light hydrocarbons. More specifically, the invention is concerned with a process for separating a heavy oil from a light hydrocarbon utilizing, as a means of separation therefor, a membrane.

As was hereinbefore set forth, it has now been discovered that certain types of membranes may be employed as separation means whereby a heavy oil may be separated from a light hydrocarbon by passing a mixture thereof through a particular type of membrane. The separation process of the present invention may be applied in a wide variety of areas including the processing of heavy oil such as deasphalting, solvent extraction of lube oils, the treatment of solvent/oil mixtures from emulsification processing as well as processes involving the extraction of edible oils, that is, vegetable or animal oils which do not contain more than about 0.1% of free fatty acid and which are used for food purposes such as cooking, salad dressing, in the manufacture of oleomargarine or other butter substitutes, etc. Such oils may include soybean oil, corn oil, etc.

It is therefore an object of this invention to provide a process for the separation of heavy oils from light hydrocarbons.

A further object of this invention is to provide a process for separating heavy oil constituents of a mixture from light hydrocarbon constituents utilizing as a means for the separation thereof, a membrane.

In one aspect, an embodiment of this invention resides in a process for the separation of a heavy oil and a light hydrocarbon from a mixture thereof which comprises passing said mixture over a membrane comprising a polymer which maintains its integrity in the presence of hydrocarbon compounds at separation conditions whereby said light hydrocarbon is recovered as the permeate and said heavy oil is recovered as the retentate.

A specific embodiment of this invention is found in a process for the separation of crude oil from n-pentane from a mixture thereof which comprises passing said mixture over a membrane comprising polysulfone which has been cast from a mixture of dimethylformamide and methyl cellusolve at process conditions which include a temperature in the range of from about ambient to about 100° C. and a pressure in the range of from about 50 to about 1000 pounds per square inch whereby said pentane is recovered as the permeate and said crude oil is recovered as the retentate.

Other objects and embodiments will be found in the following further detailed description of the invention.

DETAILED DESCRIPTION OF THE INVENTION

As was previously discussed, the present invention relates to a process for the separation of liquids of disparate molecular weight utilizing, as a means for separation, a membrane. The means of separation will be particularly applicable in processes such as the treating of emulsions whereby heavy oil emulsions are broken by the means of a solvent, in food processing whereby edible oils are extracted utilizing as the extractive agent a solvent, in the preparation of synthetic fuels as exemplified by the dilution of shale oil with a solvent whereby insoluble particles may be recovered by filtration, in coal liquefaction in which a solvent is utilized to facilitate the filtration of insoluble particles, or in the treatment of wood chips utilizing a solvent such as ethanol to dissolve the cellulosic material. It is to be understood that these various processes are merely given as examples of processes in which a membrane may be employed to effect the desired separation.

The separation of heavy oils from relatively light hydrocarbons which have been used as solvents in the various processes is effected by passing a mixture of heavy oils and light hydrocarbons over a membrane whereby a separation is effected and the light hydrocarbons are recovered as the permeate while the heavy oils are recovered as the retentate. The membrane which is employed to effect the desired separation will comprise an organic polymer which will maintain its integrity in the presence of hydrocarbon compounds at the particular separation conditions which are utilized to effect the desired separation. The particular organic polymer which is used should possess certain desirable characteristics with regard to stability under process conditions. For example, the polymeric material should undergo no volume change while being maintained at a temperature of 50° C. for an extended period of use which may range up to a time of one year or more; a chemical stability as evidenced by the polymer undergoing no dissolution swelling or plasticizing when subjected to the action of a solvent at a temperature of about 50° C.; a mechanical stability as evidenced by maintaining its physical integrity and not undergoing any compaction when placed under a pressure of 300 psig and, in addition, may also possess the ability or capability of easily changing porosity. In addition, the membranes may also possess a wide range of pore sizes, said pore sizes ranging from about 10 to about 500 Angstroms. The membranes which are used should also be fabricated from polymers which possess a different solubility parameter than is possessed by the light hydrocarbons which are separated from the heavy oils. For example, typical hydrocarbons which are employed as solvents will have solubility parameters in the range of from about 6 to about 8 $[cal/cm^3]^{\frac{1}{2}}$. In order to avoid the possibility of having the membrane dissolved in the solvent, it is necessary that the membrane possess solubility parameters sufficiently different from those which are possessed by the hydrocarbon solvents. In the preferred embodiment of the invention, the polymers which are employed to form the membranes will possess solubility parameters in excess of about 9.0. Some representative examples of polymers which may be formed into the membranes which are useful as separation means for the process of the present invention will include polymers in which the solubility parameter is designated as $\delta$ $[cal/cm^3]^{\frac{1}{2}}$ such as polysulfone, 10.6; polycarbonate, 9.6; cellulose acetate, 11.0; polyacrylonitrile, 12.4; polyvinyl alcohol, 12.6; Nylon 6,6, 13.6; Nylon 8, 12 to 14; cellulose, 15.6; polybenzoimidazole, about 11.3; polyamide 8 to 10; polyimide about 10 to 12; polytetrafluoroethylene (Teflon), 6.2; etc. It is to be understood that the aforementioned polymers are only representative of the type of compounds which may be employed to prepare a membrane suitable for use in the present process, and that the invention is not necessarily limited thereto.

The desired membranes which are used for the separation of heavy oils from light hydrocarbons which may be employed as solvents such as ethanol, propanol, butanol; propane, n-pentane, iso-pentane, n-hexane, n-heptane, n-decane; benzene, toluene, the xylenes, etc. are prepared by dissolving the polymer in a suitable solvent. Examples of solvents which are employed to form the desired casting solution will include N-methyl-2-pyrollidone, dimethylformamide, dimethylsulfoxide, dichloromethane, dichloroethane, chloroform, methyl cellusolve, propylene glycol, or mixtures of the aforesaid solvents such as dimethylformamide/methyl cellusolve, N-methyl-2-pyrollidone/propylene glycol, N-methyl-2-pyrollidone/dimethylsulfoxide, etc. It is again to be understood that the aforementioned solvents are only representative of the class of compounds which may be employed to form a casting solution and that any suitable solvent which possesses the ability to dissolve the polymeric compound which is to be formed into a membrane may be employed.

The polymeric compound is dissolved in the aforesaid solvent in an amount sufficient to form a polymer concentration in the range of from about 10% to about 30% by weight of the casting solution, the preferred concentration for flat sheet membranes being in a range of from about 17% to about 20%. The casting solution is then poured onto a casting surface which may comprise any suitable material possessing the necessary smooth surface such as a glass plate, a metal plate, a polymeric backing, etc. The solution may be cast at a constant rate which may be in the range of from about 5 to about 30 feet per minute and is passed underneath a casting knife which has been set at a predetermined space or interval from the casting surface in order to permit the obtention of a membrane at a predetermined thickness. For example, the thickness of the membrane which is in a relatively thin film may be within a range of from about 5 to about 15 mil and preferably in a range of from about 10 to about 12 mil.

If so desired, a time interval of from about 1 second to about 5 minutes may elapse to allow for solvent evaporation. If so desired, the polymeric film on the casting surface may be immediately immersed in a water solution to provide for the coagulation of the polymer and the formation of the membrane film. The temperature of the water bath may be in a relatively wide range of from about 0° to about 50° C., the preferred temperature being less than about 10° C. in order to facilitate the coagulation of the polymer into the membrane film. After allowing the polymer to form and set for a predetermined period of time which may range from 10 seconds to about 1 hour, the coagulation time being dependent upon various factors including temperature, type of polymer, etc., the membrane is recovered for use in the separation of heavy oils from light hydrocarbons.

An alternative method for preparing the membranes which are utilized to effect the separation of the heavy oils and light hydrocarbons comprises a continuous casting operation. When this type of operation is employed, a backing such as a cloth of a natural or synthetic origin such as cotton, Dacron, Nylon, nonwoven polyester, etc. is continuously passed under a hopper. The hopper will contain a solution of the polymer dissolved in a solvent of the type hereinbefore set forth such as N-methyl-2-pyrollidone, dimethylformamide, mixtures of solvents such as N-methyl-2-pyrollidone/propylene glycol, etc., said hopper being provided with an orifice at the bottom thereof for allowing passage of the solution therethrough. One side of the orifice will contain a casting knife which will be set at a predetermined distance within the range hereinbefore set forth from the surface of the backing. The fabric is then passed at a predetermined rate under the hopper wherein the upper surface of said backing is contacted with the polymeric solution and trimmed to the desired level. The coated backing is thereafter passed into a water bath which is maintained at a relatively low temperature whereby the polymer is coagulated and the resulting membrane comprising a thin film of the polymer on the porous backing may be recovered.

It is also contemplated within the scope of this invention that additional processing steps for treatment of the membrane prior to its use as a separation means may be effected. However, these steps as herein described are optional in nature and are not essential to the formation of the desired membranes. If so desired, the membrane which has formed in the water bath and has been recovered may be placed in a 50% aqueous ethanol solution for a period of time ranging from about 1 minute to about 1 hour, following which the membrane is annealed by being placed in a hot water bath in which the temperature is maintained in a range of from about 80° to about 100° C. After being heat-treated for a period of time which may range from about 0.5 to about 10 minutes, the treated membrane is recovered and dried at a temperature ranging from about ambient up to about 60° C..

Alternatively the formed membranes may be subjected to a solvent pretreatment prior to use thereof in a separation system. The membranes may be treated with solvents possessing varying polarity whereby the membrane flux and selectivity can be tailored to fit a specific or desired objective. For example, the membranes may be soaked in solvents of decreasing polarity by treating said membrane with a water solution for a period of time ranging from about 0.5 to about 2 hours or more, thereafter removing the membrane from the water solution and placing it in a solution comprising an equal amount of water and isopropanol for a like period of time, thereafter treating the membrane with a 100% solution of isopropanol, thereafter placing the membrane in a 50/50 solution of isopropanol and n-pentane and finally, treating the membrane with a 100% solution of n-pentane for a period of time ranging from about 1 to about 6 hours. If so desired, in the final step of treatment with n-pentane, a superatmospheric pressure ranging from about 50 to about 100 psig may be employed. However, the use of superatmospheric pressures is not essential for the treatment procedure. By subjecting the membrane to such a treatment, the collapse of the pores in the membrane will be prevented and thus contribute to an increase in flux without affecting the selectivity of the separation.

The process of the present invention in which a light hydrocarbon is separated from heavy oil may be effected in any suitable manner and may comprise either a batch or continuous type operation. For example, when a batch operation is employed to effect the separation, the mixture of heavy oil and light hydrocarbon may be placed in an appropriate apparatus such as, for example, a static cell. The membrane of the type hereinbefore set forth in greater detail may be positioned on a porous metal support which may constitute the bottom of the cell. The shape of the cell is immaterial for the separation operation and may be in cylindrical, rectangular or square form. The mixture to be separated is then placed in the cell which is sealed and pressurized with a substantially inert gas such as nitrogen, argon, helium, etc. to the desired operating pressure. The mixture is continuously stirred by mechanical means such as a spin bar in order to maintain a homogeneous mixture of the two components. The pressure which is maintained by continuous application of the gas will force the light hydrocarbons through the membrane to afford the desired separation, said light hydrocarbons being recovered as the permeate while the heavy oil is recovered as the retentate.

It is also contemplated within the scope of this invention that the separation process may be effected in a continuous method of operation. When such a type of operation is employed, a reservoir which contains the mixture to be separated will continuously feed the mixture by means of necessary valves and pumps across the surface of a membrane which is positioned in a module. As in the case of the batch type operation, the membrane module is maintained at the proper operating conditions of temperature and pressure by external heating means as well as gas introduction means. In the membrane module the light hydrocarbons will pass through the membrane while the heavy oils will be retained on the upstream side of the membrane and may be recovered as retentate, while the light hydrocarbon may be recovered as the permeate.

The following examples are given for purposes of illustrating the process of this invention. However, it is to be understood that these examples are given merely for purposes of illustration and that the present invention is not necessarily limited thereto.

EXAMPLE I

In this example, polysulfone was dissolved in a solvent comprising a mixture of N-methyl-2-pyrollidone and propylene glycol in an amount sufficient to impart a 17 to 20% by weight of polysulfone in said solution, the dissolution of the polysulfone in the solvent being effected at ambient temperature and atmospheric pressure. Following this, the polysulfone was cast on a glass plate which had a casting knife set at a thickness of 10 mils. The solution was cast at a rate of 10 ft./min. and after a short period of time had elapsed to allow solvent evaporation, the glass plate containing the film was placed in a water solution which was maintained at 4° C. by means of an ice bath. The polysulfone coagulated to form a membrane and, after allowing the coagulation to proceed for a period of about 30 minutes, the membrane was recovered.

Membranes prepared according to the above paragraph were placed in a stirred Amicon cell utilizing a porous support at the bottom of the cell. A feed comprising a mixture of n-pentane and deasphalted Boscan crude oil in a weight ratio of 1:6 of n-pentane to crude oil was placed in the stirred cell. The separation was effected at a temperature of 50° C. while subjecting the feed to a pressure of 125 psig of nitrogen on the feed side and a pressure of 25 psig on the permeate side.

Samples of the permeate were recovered after cooling the permeate chamber with a dry ice bath. The flux through the membranes was measured and found to be in a range of from 6.00 to 14.11 GSFD with a selectivity of hexane to crude oil in a range of from 2.71 to 3.52.

EXAMPLE II

In this example, a membrane which was prepared according to the method set forth in Example I above was utilized in a continuous flow operation in which a mixture of solvent and crude oil similar to that set forth in Example I above was charged to a module containing the membrane at flow rates ranging from 10 to 200 mL/min. and pressures ranging from about 150 to about 250 psig. The permeate was continuously recycled to the feed reservoir to maintain constant conditions while small samples of permeate were collected and analyzed. It was found that the flux of this unit was in a range of from 4 to 7 GSFD while the selectivity of solvent to crude oil was in a range of from 2.8 to 4.0.

EXAMPLE III

A polysulfone membrane was prepared by continuously passing a non-woven polyester backing under a hopper containing a solution of polysulfone dissolved in a solvent comprising a mixture of N-methyl-2-pyrollidone and propylene glycol. The hopper was provided with a knife set 10 mil from the surface of the backing. The backing was passed under the hopper at a casting speed of 18 feet per minute and after being contacted with the solution was passed into a water bath maintained at a temperature of 4° C. wherein the polymer was coagulated. The membrane, after being recovered from the coagulation step, was subjected to a solvent pretreatment prior to use as a separation means by immersing the membrane in a 100% water solution followed by treatment with a 50/50 solution of water and isopropanol, a 100% solution of isopropanol, a 50/50 solution of isopropanol/n-pentane followed by a final treatment with a 100% solution of n-pentane. The membrane was thereafter utilized to separate a mixture of the Boscan heavy crude and an n-pentane solvent, the separation being effected at a pressure of 220 psig and ambient temperature. It was found that the permeate flux was about 9.08 GSFD with a selectivity of n-pentane to crude oil of 3.73.

EXAMPLE IV

To illustrate the advantages of casting a membrane from solvents of the type hereinbefore set forth in greater detail, a series of separation processes were run utilizing various polymeric membranes. The tests were effected in a manner similar to that set forth in Example I above, that is, a feedstock comprising a mixture of hexane and deasphalted Boscan crude oil was pressurized in a stirred Amicon cell for passage over the various membranes. The separation was effected at a temperature of 25° C. with the feed being pressurized with nitrogen in a range of from 75 to 150 psig, while the pressure regulator on the permeate side was maintained at 25–30 psi to avoid vaporization of the light solvent. Again, samples were taken after cooling the permeate chamber with a dry ice bath. The results of the test are set forth in the Table below:

TABLE

| Membrane | Flux GSFD | Selectivity Solvent/Crude |
|---|---|---|
| Polyvinyledene fluoride | V. High[1] | 1.0 |
| Polytetrafluoroethylene | High | 1.0 |
| Cellulose Acetate[2] | 0 | — |
| Cellulose Acetate[3] | 0 | — |
| Hydrolyzed Cellulose Acetate[4] | 9.5 | 1.15 |
| UM05[5] | 0 | — |
| YM2 | 7.9 | 1.1 |
| Polycarbonate | 38 (10 psi) | 1.2 |
| Polysulfone (A)[6] | 1.8–2.0 | 2.1–2.3 |
| Polysulfone (B)[7] | 3.3–4.0 | 2.0–2.2 |
| Polysulfone | 87 (30 psi) | 1.0 |
| TFC-801 | 0 (200 psi) | — |
| Polysulfone (A) Coated with Polyvinyl Alcohol | 0 | — |
| Polysulfone (A) Coated with Silicone Rubber | 0.13 | 2.0 |
| Polysulfone (A) Coated with Polyethyleneimine[8] | — | — |
| Silicone Rubber | V. Low | ∞ |
| (Solvent Swollen)[9] | | |

[1]PVF had high initial flux but slowly swelled in the hydrocarbon and the flux decreased.
[2]Cellulose Acetate appeared thermodynamically stable. The lack of an observed flux may be due to pore collapse under surface tension forces.
[3]Annealed at 70° C.
[4]Cellulose Acetate annealed at 85° C. was hydrolyzed in NaOH for 4 minutes.
[5]Membrane or backing swelled in hydrocarbon.
[6]Gas-grade type.
[7]Semi-permeable type.
[8]PEI dissolved.
[9]High swelling of membrane.

It is readily apparent from the above Table that certain polymeric membranes possess either a desirable flux or a desirable selectivity, but not a combination of the two. This is in contradistinction to the polysulfone membranes, both of the gas-grade type and semi-permeable type which were prepared according to the process of the present invention which, especially in the case of the semi-permeability type membrane, possesses both a desirable flux and a desirable selectivity.

EXAMPLE V

To illustrate a possible advantage which may be had by subjecting the membrane to a solvent pretreatment prior to use in a separation system, polysulfone membranes were prepared according to the method set forth in Example III above. The membranes were continuously cast from a solvent solution comprising a mixture of dimethylformamide and methyl cellusolve on a polyester backing. One membrane was utilized without any pretreatment while the other membrane was treated with a series of solvents of decreasing polarity. The solvent sequence which was employed for treating this membrane comprised immersion in a solution of 50% isopropanol, 50% water; immersion in a 100% isopropanol solution; immersion in a solution comprising 50% isopropanol, 50% pentane and finally, immersion in a 100% pentane solution. In a variation on this sequence, the final step was also carried out under a pressure of 50 psig. The membranes were utilized to separate a deasphalted Boscan crude oil/hexane mixture in a stirred Amicon cell at ambient temperature, a pressure of 75 psig on the feed and a pressure of 24 psig in the permeate. The results of these tests are set forth in the Table below:

TABLE

Effect of Solvent-Treatment on PS Membranes 75/25 psig

| Treatment | Temp., °C. | A GSFD | A Sel. | B GSFD | B Sel. |
|---|---|---|---|---|---|
| None | 25 | 1.8 | 2.3 | 3.3 | 2.2 |
|  | 50 | 1.9 | 2.0 | 5.2–7.0 | 1.9 |
| Solvent Soaked | 25 | — | — | 11.5 | 2.1 |
|  | 50 | 2.6 | 1.9 | 6.3–18.3 | 1.9–2.3 |
| Solvent Treatment with Pressure |  |  |  | 17 | 1.9 |
|  |  |  |  | 20 | 1.9 |

Solvent treated membranes were also tested in a continuous flow-through unit. Fluxes in the range of from 5 to 13 GSFD with a selectivity of 3 to 4 were obtained as well as fluxes of 15 to 25 GSFD at selectivities of 2 to 3. It was also possible to easily clean the membranes by either increasing temperature for a short time, washing with solvent, or by reducing pressure and allowing the feed to sweep across the face of the membrane.

EXAMPLE VI

To illustrate the ability to concentrate heavy-oil streams by recovering light solvent, a membrane was prepared and solvent-soaked according to the method set forth in Example V. The membrane was placed in a stirred cell and 200 ml of n-pentane/Boscan crude (12.2%) was added. The feed was concentrated at 50° C. by applying a pressure of 150 psi with permeate pressure maintained at 25 psi. A constant flux of about 10 GSFD and selectivity of 3.7–4.0 was maintained. as the feed solution was gradually concentrated to 40% heavy oil. Beyond 40% oil, the flux diminished rapidly.

EXAMPLE VII

A separation membrane may be prepared by dissolving polyacrylonitrile in a solvent comprising a mixture of dimethylformamide and methyl cellusolve at ambient temperature and atmospheric pressure. The polyacrylonitrile may then be cast on a glass plate and after allowing for solvent evaporation, the glass plate containing the film may be placed in a water solution at subambient temperature. After coagulation of the membrane, it may then be recovered from the glass plate and treated in a manner similar to that hereinbefore set forth with a series of solvents possessing decreasing polarity.

The resulting membrane may then be utilized in an Amicon cell to separate a mixture of soybean oil and hexane, said separation being effected at ambient temperature and a pressure of about 75 psig.

Like separations may also be effected utilizing a polyamide membrane to separate shale oil and hexane.

We claim as our invention:

1. A process for the separation of a deasphalted crude oil and a light hydrocarbon solvent from a mixture thereof which comprises passing said mixture over a membrane comprising polysulfone at separation conditions whereby said light hydrocarbon solvent is recovered as the permeate and said deasphalted crude oil is recovered as the retentate.

2. The process as set forth in claim 1 in which said separation conditions include a temperature in the range of from about ambient to about 100° C. and a pressure in the range of from about 50 to about 1000 pounds per square inch.

3. The process as set forth in claim 1 in which said membrane possesses pore sizes in a range of from about 10 to about 500 Angstroms.

4. The process as set forth in claim 1 in which said heavy oil is a crude oil and said light hydrocarbon is pentane.

5. The process as set forth in claim 1 in which said polymer which forms said membrane is cast from a solvent solution comprising at least one compound selected from the group consisting of N-methyl-2-pyrollidone, dimethylformamide, diethylsulfoxide, dichloromethane, dichloroethane, chloroform, methyl cellusolve and propylene glycol.

6. The process as set forth in claim 5 which said solvent solution comprises dimethylsulfoxide.

7. The process as set forth in claim 5 in which said solvent solution comprises a mixture of dimethylformamide and methyl cellusolve.

8. The process as set forth in claim 5 in which said solvent solution comprises a mixture of N-methyl-2-pyrollidone and propylene glycol.

9. The process as set forth in claim 5 in which said solvent·solution comprises dichloroethane.

10. The process as set forth in claim 5 in which said membrane possesses a thermal stability characterized by no volume change at 50° C., a chemical stability as characterized by no swelling dissolution or plasticizing by solvents at 50° C. and a mechanical stability as characterized by no compaction at about 300 pounds per square inch.

11. The process as set forth in claim 1 further characterized in that said polymer membrane is treated at treatment conditions prior to use thereof by contacting said membrane with a series of solvents of decreasing polarity.

12. The process as set forth in claim 11 in which one of said series of said solvents comprises a 50/50% solution of isopropanol and water.

13. The process as set forth in claim 11 in which one of said series of said solvents comprises a 100% solution of isopropanol.

14. The process as set forth in claim 11 in which one of said series of said solvents comprises a 50/50% solution of isopropanol and pentane.

15. The process as set forth in claim 11 in which one of said series of said solvents comprises a 100% solution of pentane.

* * * * *